(12) United States Patent
Molock et al.

(10) Patent No.: US 6,936,641 B2
(45) Date of Patent: Aug. 30, 2005

(54) MACROMER FORMING CATALYSTS

(75) Inventors: Frank F. Molock, Orange Park, FL (US); Annie C. Maiden, Jacksonville, FL (US); Xiaoping Lin, Jacksonville, FL (US); Carrie L. Caison, Orange Park, FL (US); Michael R. Clark, Jacksonville, FL (US); Robert Love, Hyrum, UT (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 209 days.

(21) Appl. No.: 10/183,765

(22) Filed: Jun. 25, 2002

(65) Prior Publication Data

US 2004/0002556 A1 Jan. 1, 2004

(Under 37 CFR 1.47)

(51) Int. Cl.$^7$ .............................. C08F 2/50; C08F 30/08
(52) U.S. Cl. ............................. 522/64; 52/18; 52/172; 52/28; 526/279
(58) Field of Search .............................. 522/18, 28, 64, 522/172; 523/107; 264/1.38; 526/279

(56) References Cited

U.S. PATENT DOCUMENTS

| | | |
|---|---|---|
| 3,806,178 A | 4/1974 | Gaylord |
| 4,120,570 A | 10/1978 | Gaylord |
| 4,136,250 A | 1/1979 | Mueller et al. |
| 4,139,513 A | 2/1979 | Tanaka et al. |
| 4,139,692 A | 2/1979 | Tanaka et al. |
| 4,153,641 A | 5/1979 | Deichert et al. |
| 4,235,985 A | 11/1980 | Tanaka et al. |
| 4,665,123 A | 5/1987 | Goldenberg |
| 4,670,506 A | 6/1987 | Goldenberg et al. |
| 4,720,187 A | 1/1988 | Goldenberg et al. |
| 4,740,533 A | 4/1988 | Su et al. |
| 4,837,289 A * | 6/1989 | Mueller et al. ............. 526/279 |
| 4,910,277 A | 3/1990 | Bambury et al. |
| 4,978,713 A | 12/1990 | Goldenberg |
| 5,034,461 A | 7/1991 | Lai et al. |
| 5,070,215 A | 12/1991 | Bambury et al. |
| 5,244,981 A | 9/1993 | Seidner et al. |
| 5,260,000 A | 11/1993 | Nandu et al. |
| 5,310,779 A | 5/1994 | Lai |
| 5,314,960 A | 5/1994 | Spinelli et al. |
| 5,314,961 A | 5/1994 | Anton et al. |
| 5,331,067 A | 7/1994 | Seidner et al. |
| 5,349,004 A * | 9/1994 | Kumar et al. ................ 524/461 |
| 5,358,995 A | 10/1994 | Lai et al. |
| 5,371,147 A | 12/1994 | Spinelli et al. |
| 5,410,016 A * | 4/1995 | Hubbell et al. ............ 528/354 |
| 5,486,587 A * | 1/1996 | Shay et al. .................. 526/333 |
| 5,534,559 A | 7/1996 | Leppard et al. |
| 5,710,302 A | 1/1998 | Kunzler et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,849,811 A | 12/1998 | Nicolson et al. |
| 5,962,458 A | 10/1999 | Lohmann et al. |
| 5,962,548 A * | 10/1999 | Vanderlaan et al. ......... 523/107 |
| 5,998,498 A | 12/1999 | Vanderlaan et al. |
| 6,007,833 A * | 12/1999 | Chudzik et al. ............. 424/425 |
| 6,031,059 A * | 2/2000 | Vanderlaan et al. ......... 526/279 |
| RE5,760,100 | 11/2000 | Nicolson et al. |
| RE5,776,999 | 11/2000 | Nicolson et al. |
| RE5,789,464 | 11/2000 | Nicolson et al. |
| 5,849,811 A | 11/2000 | Nicolson et al. |
| 6,353,057 B1 | 3/2002 | He et al. |
| 6,367,929 B1 * | 4/2002 | Maiden et al. .......... 351/160 H |
| 6,414,049 B1 | 7/2002 | Alli et al. |

FOREIGN PATENT DOCUMENTS

| | | |
|---|---|---|
| EP | 0849296 A2 | 6/1998 |
| WO | WO 01/70824 A | 9/2001 |

* cited by examiner

Primary Examiner—Susan Berman

(57) ABSTRACT

The invention is the method of preparing macromer for use in making ophthalmic lenses comprising combining two or more monomers and using a macromer-forming catalyst, wherein the macromer-forming catalyst comprises triethylamine or bismuth.

20 Claims, 1 Drawing Sheet

Enthalpy of Acquafilcon-A containing triethylamine catalyzed macromer versus shelf life

MACROMER FORMING CATALYSTS

BACKGROUND OF THE INVENTION

This invention relates to the use of macromer-forming catalysts in the formation of macromers, especially the macromers used to make ophthalmic lenses.

Ophthalmic lenses such as contact lenses are often made in polymerization processes which employ initiators. Acylphosphine oxides are a useful class of initiators for free radical polymerizations of the type frequently used to make ophthalmic lenses. Bisacylphosphine oxides and their use are described in U.S. Pat. No. 5,534,559 incorporated herein by reference. All of the patents and patent applications listed herein are incorporated by reference. Unfortunately, the prior art macromer-forming catalysts which are used in the preparation of the macromers, which are used to make ophthalmic lenses, often adversely effect the stability of these initiators and the use shelf life of the multicomponent formulations which contain them.

It is often desirable to prepare a mixture of materials together with one or more macromers, one or more initiators and other additives that will ultimately form the lens upon completion of curing. These types of mixes are referred to as the "monomer mix" in this specification.

Stability of the initiator can effect the shelf life of the monomer mix. Increasing the "shelf life" or stability of the monomer mix from that seen in the prior art is desirable since it reduces the need to frequently prepare monomer mix lots (as described below) and the possibility of introducing lot to lot and intra-lot variations in lens production.

Unfortunately, in the prior art initiators tend to be unstable in a variety of environments lessening their potential. EP 849,296 proposed a method of stabilizing bisacylphosphine oxide initiators used in the production of urethane (meth) acrylate polymers used for optical fiber coatings. The method involves preparing a urethane (meth)acrylate oligomer using a tertiary amine catalyst and then mixing with the photoinitiator and other coating formulation components. There are also similar methods in the prior art of stabilizing monoacylphosphine oxide photoinitiators in the presence of a tin compound used as a macromer-forming catalyst in the urethane (meth)acrylate oligomer synthesis. U.S. patent application Ser. No. 01/09,076 teaches the use of tin catalysts with acetic acid.

Unfortunately, a tin catalyst such as dibutyl tin dilaurate (DBTDL) is not desirable when applied to monomer mixes used to make ophthalmic lenses because of the potentially deleterious effect it has on the photoinitiator and may have on various other components of the monomer mix. This is particularly true where the monomer mix is used to make silicone hydrogel lenses.

The prior art teaches the use of Lewis acid catalysts, including, but not limited to, tin catalysts, such as DBTDL for the formation of macromers. The decrease in initiator (especially photoinitiator, particularly bis-(2,6-dimethoxybenzoyl)-(2,4,4-trimethylpentyl) phosphine oxide (DMBAPO)) concentration after mixing into a monomer mix results in the production of lenses having unacceptable parameters and physical attributes. Therefore, a new type of macromer-forming catalysts, which does not effect initiator concentration, is desirable.

SUMMARY OF THE INVENTION

The present invention involves the use of macromer-forming catalysts, which catalyze the attachment of reactive polymerizable groups to a macromer, from electrophilic compounds and macromer-precursor materials, ("Macromer-forming Catalysts"), and which include, but are not limited to, tertiary amines, preferably triethylamine ("TEA"), and bismuth catalysts, preferably bismuth carboxylates, more preferably bismuth (III) 2-ethylhexanoate, in the macromer synthesis used in the making of ophthalmic lenses. In one embodiment, the present invention relates to composition of matter comprising: a macromer formed from an electrophilic compound and a macromer-precursor material in the presence of a macromer-forming catalyst; combined with a visible light photoinitiator, wherein the macromer-forming catalyst is compatible with the photoinitiator.

DETAILED DESCRIPTION OF THE INVENTION

Figure 1:
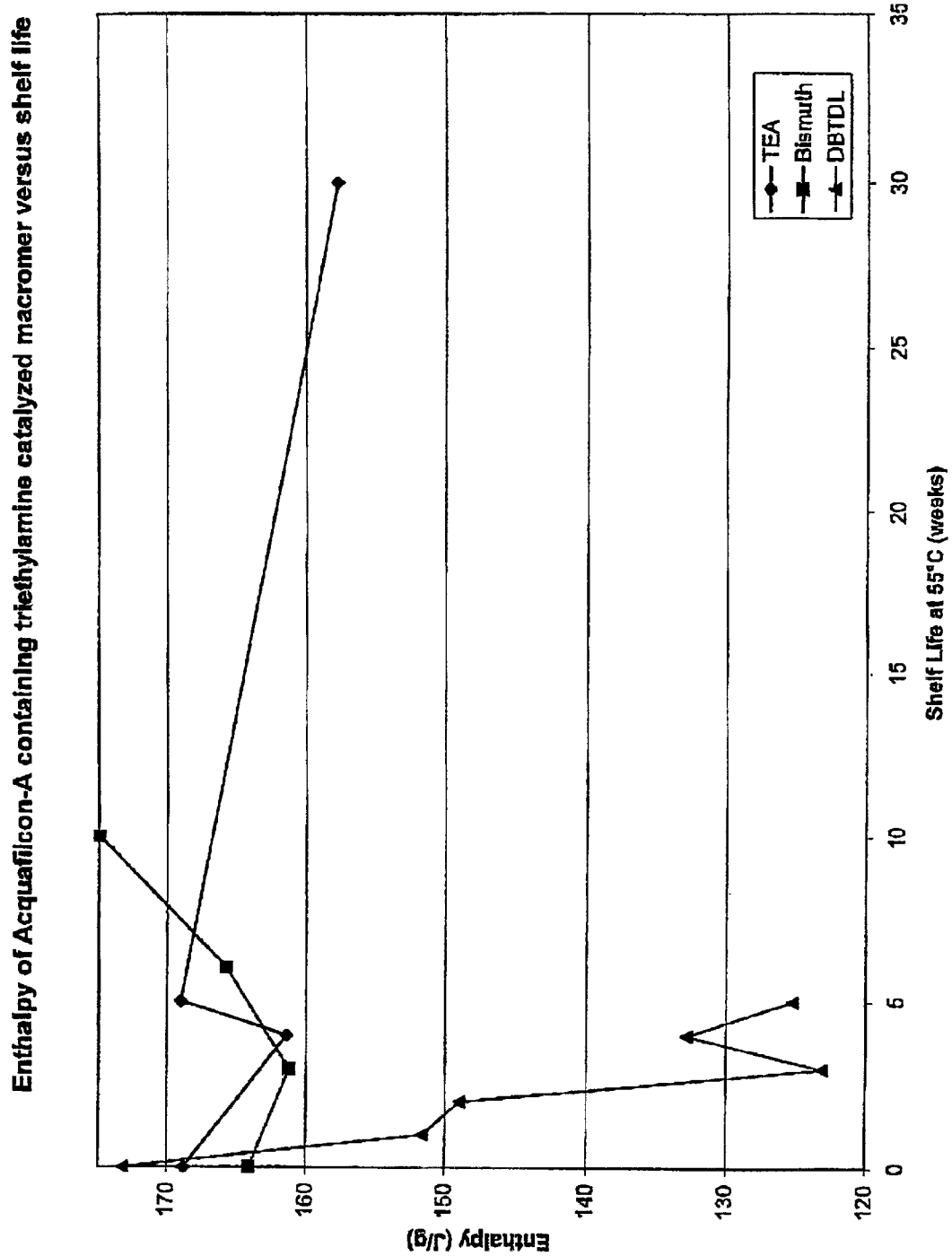
FIG. 1 is a graph showing the change in enthalpy of photopolymerization with aging for three different monomer mixes, one with a triethylamine ("TEA") catalyzed macromer, one with a DBTDL catalyzed macromer and one with a K-KAT 348 bismuth carboxylate catalyzed macromer.

As used herein, macromer-forming catalysts are catalysts that catalyze the reaction (preferably Lewis bases) but are compatible with visible light activated photoinitiators, such that they do not adversely affect the concentration of the photoinitiator after mixing into the monomer mix, maintaining a desired shelf life. The macromer-forming catalysts include, but are not limited to, amines, pyridines, sodium hydroxides, sulfuric acids, trifluoroacetic acids, bismuth salts and tertiary amines.

The electrophilic compound has the following structure

RG-LG-PG where RG comprises a reactive group, which may be selected from the group comprising electrophilic functional groups including, but not limited to, isocyanate, acid halide, acid anhydride, ester, epoxide, acetal, aldehyde, alkyl halide (preferably an activated alkyl halide). LG comprises a divalent linking group, including, but not limited to, an alkyl, aryl, ester or ether group or a covalent bond. PG comprises a group that can polymerize under free radical polymerization conditions, including, but not limited to, a group comprising a vinyl or substituted vinyl group, preferably activated by an adjoined ester, lactam or aryl group. Examples of the electrophilic compounds include, but are not limited to, as 3-isopropenyl-α,α-dimethylbenzyl isocyanate (TMI), vinylbenzyl chloride, allyl chloride, meth (acryloyl)chloride, (meth)acrylic anhydride, methyl methacrylate, methacrylamidoacetaldehyde dimethylacetal, 4-methacrylamidobutyraldehyde diethylacetal, glycidyl (meth)acrylate, 2-isocyanatoethyl methacrylate, allyl isocyanate, vinyl isocyanate, isomeric vinylbenzyl isocyanate or adduct of 2-hydroxyethyl methacrylate (HEMA) with 2,4-toluene diisocyanate (TDI) or isophorone diisocyanate (IPDI), preferably the 1:1 adduct. Mixtures of the above may also be used.

The macromer-precursor material comprises such reactive groups, including, but not limited to, hydroxyl, amino, carboxyl, diol or thiol groups. The electrophilic compound covalently bonds at the RG group with the macromer-precursor material, forming a covalent bond, such as, without limitation, a urethane, urea, ester or ether group.

The macromer-precursor may also comprise chemical groups that contribute to high oxygen permeability such as siloxane groups such as polydimethylsiloxane groups, or polyfluorinated groups. The macromer-precursor may also comprise hydrophilic groups such as hydroxyls (in excess of those needed to react with the electrophile), amide or ether groups such as polyethylene oxide groups. Such hydrophilic groups may contribute to the formation of optically clear solutions of silicone and hydrophilic monomers used in the monomer mix. In a preferred embodiment, the macromer-precursor comprises a combination of silicone and hydroxyl groups, and thus contributes to both the compatibility of the monomer mix, and the oxygen permeability of the ultimate ophthalmic lens polymer. The macromer precursor may have a molecular weight of from about 200 to about 2,000,000, more preferably from about 800 to about 100,000, and most preferably from about 1000 to about 20,000.

One of the major benefits of using the claimed macromer-forming catalysts in the macromer synthesis is that the initiator subsequently used in the polymerization process is not adversely affected. Additionally, any of the macromer-forming catalysts can be adjusted in amount to give acceptable reaction time in the macromer formation.

The electrophilic compound and macromer-precursor material are exposed to a macromer-forming catalyst in order to synthesize the macromer. The preferred macromer-forming catalysts are TEA or bismuth (III) 2-ethylhexanoate.

The amount of macromer-forming catalysts containing bismuth used in the macromer formation is about 0.02 mole % to about 2.0 mole % macromer-forming catalysts relative to an electrophilic compound, such as TMI, preferably about 0.05 mole % to about 1.0 mole %, most preferably about 0.05 mole % to about 0.2 mole %. Electrophilic compounds include monoisocyanates, diisocyanates and compounds with greater than 2 isocyanate groups, preferably a compound with at least one isocyanate group and one polymerizable double bond, more preferably 2-isocyanatoethyl methacrylate (IEM), most preferably TMI.

The amount of TEA used in the macromer formation is preferably about 0.1 mole % to about 2.0 mole % relative to an electrophilic compound such as TMI, more preferably about 1.32 mole % relative to TMI.

A macromer in the present invention is a product produced by the reaction of an electrophilic compound and a macromer-precursor material in the presence of a macromer-forming catalyst. A preferred LG group comprises a urethane linkage. The urethane linkages in the macromer are formed as follows:

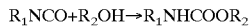

$R_1NCO+R_2OH \rightarrow R_1NHCOOR_2$

The macromer includes, but is not limited to, the following types of macromers: linear α,ω-terminated hydroxyl functional polymers, linear α,ω-terminated amino functional polymers, linear α,ω-terminated carboxylic acid functional polymers, linear hydroxyl, amino, or carboxylic acid monofunctional polymers, hydroxyl, amino, or carboxylic acid terminated star polymer (3–8 arms), pendant hydroxyl functional polymers, pendant amino functional polymers, pendant carboxylic acid functional polymers, any combination of pendant and chain terminated hydroxyl, amino, or carboxylic acid functional polymers listed above.

The present invention involves a method of preparing macromer by reacting an electrophilic compound and a macromer-precursor material in the presence of a macromer-forming catalyst, for a reaction between the electrophilic compound and the macromer-precursor material, preferably a condensation reaction. The macromer-precursor material means a compound with at least one group capable of reacting with an electrophilic compound and forming a condensation product, such as urethane, ("reacting groups"), including, but not limited to, compounds with at least one hydroxyl, amino, carboxyl, or thiol group. Preferred macromer-precursor materials comprise hydroxyls and more preferred macromer-precursor materials are comprised of or made from 2-hydroxyethyl acrylate, hydroxypropyl acrylate, hydroxypropyl methacrylate, ethoxylatedhydroxy-ethyl methacrylate, polypropylene glycol monomethacrylate, caprolactone acrylate, beta carboxyethyl acrylate, hydroxyethyl vinyl ether, N-(2-hydroxyethyl) methacrylamide, 3,4-dihydroxybutyl methacrylate, N-hydroxymethyl acrylamide, N-hydroxymethyl methacrylamide, (3-methacryloxy-2-hydroxypropyloxy) propylbis(trimethylsiloxy)methylsilane (SiGMA), acrylic acid, methacrylic acid, itaconic acid, HEMA, polyvinyl alcohol, (PVA), glycerylmonomethacrylate, methyldi (trimethylsiloxy)sylylpropylglycerol methacrylate, dextran, 2-hydroxyethylcellulose, and hydroxymethylcellulose, mixtures thereof and polymers and copolymers thereof. Preferred macromer-precursor materials comprise silicone. The macromer-precursor material may be prepared as known in the prior art, preferably by group transfer polymerization, such as those described in U.S. Pat. Nos. 5,244,981; 5,331,067; 5,314,960; 5,314,961; and 5,371,147.

Additionally, the present invention involves a macromer-forming composition comprising an electrophilic compound and a macromer-precursor material, and a macromer-forming catalyst. The macromer-forming reaction preferably takes place substantially at one or more terminal reacting groups on the macromer-precursor material and also at one or more pendant groups. Terminal reacting groups mean reacting groups which are placed at the end of any chain, as distinct from pendant groups located on a chain at positions other than either end. The macromer may be used in multicomponent formulations used to make medical devices such as ophthalmic lenses, which may be made of silicone hydrogels.

Silicone hydrogels have high oxygen permeability making them particularly desirable for use in ophthalmic lenses. Silicone hydrogels are preferably prepared by polymerizing a mixture containing at least one silicone-containing monomer and at least one hydrophilic monomer. Either the silicone-containing monomer or the hydrophilic monomer may function as a crosslinking agent or a separate crosslinker may be employed. Crosslinking agents are monomers having multiple polymerizable moieties. The term "monomer mix" when used in this sense refers to a material used in forming the ultimate polymeric ophthalmic lens system. The crosslinking agent may have repeat chain units and still be considered a monomer. Incorporating a crosslinking agent into the monomer mix may generate a cross-linked network. There are numerous silicone-containing monomeric units commonly used in the formation of silicone hydrogels. U.S. Pat. Nos. 3,808,178; 4,120,570; 4,136,250; 4,139,513; 4,139,692; 4,153,641; 4,740,533; 5,034,461; 5,070,215; 5,260,000; 5,310,779; 5,358,995; 5,710,302; 5,789,461; 5,776,999; 5,760,100; 5,849,811; 5,962,458 and 5,998,498 provide some useful examples.

Hydrophilic monomers that have previously been found useful for making silicone hydrogels include, but are not limited to: unsaturated carboxylic acids, such as methacrylic and acrylic acids; acrylic substituted alcohols, such as 2-hydroxyethylmethacrylate and 2-hydroxyethylacrylate;

vinyl lactams, such as N-vinyl pyrrolidone; and acrylamides, such as methacrylamide and N,N-dimethylacrylamide. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277 and each is incorporated herein by reference.

Siloxane monomers that have previously been found useful for making silicone hydrogels may be used in the present invention. Siloxane monomers include silicone-containing monomer and macromer having a polymerizerable vinyl group, preferably a methacryloxy group. Examples of silicone-containing monomers and macromers include, but are not limited to, mono-alkyl terminated poly-dimethylsiloxanes ("mPDMS") (mPDMS means mPDMS with a number average molecular weight of between about 200 and about 10,000, preferably between about 400 and about 2000 and most preferably between about 800 and about 1200) such as monomethacryloxy propyl terminated polydimethylsiloxane, which comprise at least two [—Si—O—] repeating units, SiGMA type monomers (defined below) which comprise a polymerizable group having an average molecular weight of about less than 2000 Daltons, a hydroxyl group and at least one [—Si—O—Si—] group and TRIS type monomers which comprise at least one $Si(OSiR)_3$ group, where R is a monovalent alkyl or aryl group. Examples of suitable methacryloxypropyltris(trimethylsiloxy)silane (TRIS) monomers include methacryloxypropyltris(trimethylsiloxy)silane.

Preferably, the mPDMS type monomers comprise total Si and attached O in an amount greater than 20 weight percent, and more preferably greater than 30 weight percent of the total molecular weight of the silicone-containing monomer. Suitable mPDMS monomers have the formula, wherein n=5 to 15

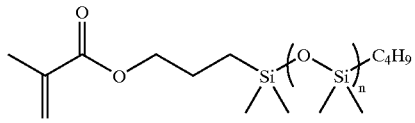

Examples of suitable linear mPDMS include:

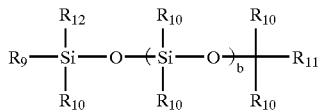

where b=0 to 100, where it is understood that b is a distribution having a mode equal to a stated value, preferably 4 to 16, more preferably 8 to 10; $R_9$ is a polymerizable monovalent group containing at least one ethylenically unsaturated moiety, preferably a monovalent group containing a styryl, vinyl, or methacrylate moiety, more preferably a methacrylate moiety; each $R_{10}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{11}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl; and $R_{12}$ is independently alkyl or aromatic, preferably ethyl, methyl, benzyl, phenyl, or a monovalent siloxane chain comprising from 1 to 100 repeating Si—O units.

The mPDMS type monomers are disclosed more completely in U.S. Pat. No. 5,998,498, which is incorporated herein by reference.

Preferably in the SiGMA type monomer silicone and its attached oxygen comprise about 10 weight percent of said monomer, more preferably more than about 20 weight percent. Examples of SiGMA type monomers include monomers of Formula I

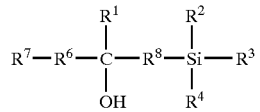

Wherein the substituents are as defined in U.S. Pat. No. 5,998,498, which is incorporated herein by reference.

Specific examples of suitable SiGMA type monomers include 2-propenoic acid, 2-methyl-2-hydroxy-3-[3-[1,3,3,3-tetramethyl-1-[trimethylsilyl)oxy]disiloxanyl]propoxy]propyl ester

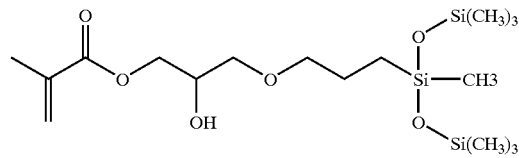

and (3-methacryloxy-2-hydroxypropyloxy)propyltris(trimethylsiloxy)silane

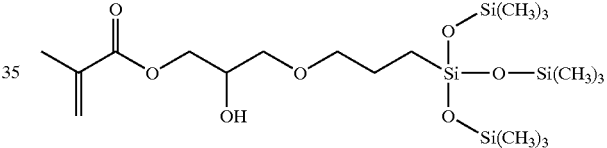

Additional suitable hydroxyl-functionalized silicone containing monomers are disclosed in U.S. Pat. No. 4,235,985; 4,139,513 and 4,139,692.

In the present invention, the macromer is the reaction product of an electrophilic compound and a macromer-precursor material in the presence of a macromer-forming catalyst. The macromer-forming catalysts include, but are not limited to, tertiary amines and bismuth catalysts.

Bismuth catalysts include, but are not limited to, bismuth carboxylates, bismuth trioxide (also called dibismuthtrioxide) $Bi_2O_3$, bismuth ortho-hydroxide $Bi(OH)_3$, bismuthyl hydroxide BiO(OH), bismuth nitrate (BiO)$NO_3$, and preferably, bismuth carbonate $(BiO)_2CO_3$. Bismuth carboxylates preferably have a carboxylate portion comprising a $C_2$–$C_{30}$, saturated or unsaturated carboxyl terminated hydrocarbon or inertly substituted hydrocarbon chain. By inertly substituted, it is meant that the hydrocarbon chain contains no substituent group which undesirably effects the catalytic behavior of the macromer-forming catalyst. Preferably the carboxylate portion is from about 6 to about 22 carbon atoms. Suitable carboxylate groups include, but are not limited to, the ions of fatty acids, as well as branched carboxylates such as neodecanoic acid, and Versatic 911 Acid. Preferred bismuth catalysts include bismuth (III) 2-ethylhexanoate (75–79%), CAS#: [67874-71-9], which is produced by King Industries, and compositions containing bismuth carboxylates. These bismuth catalysts can be used singly or as a mixture of two or more components. When bismuth catalysts are used, the time for the reaction between the electrophilic compound and the macromer-precursor material is about 3 hours.

Tertiary amines include, but are not limited to, tertiary amines having one nitrogen atom in a molecule including, but not limited to, aliphatic amines (including, but not limited to, tri-$C_{1-6}$alkylamine such as TEA and tributylamine, β-(dimethylamino)propionitrile), alicyclic amines (including, but not limited to, di-$C_{1-6}$-alkyl-$C_{3-10}$cycloalkylamines inclusive of N,N-dimethylcyclohexylamine and N,N-diethylcyclohexylamine; N,N-dicyclohexylmethylamine), certain heterocyclic amines (including, but not limited to, N-methylmorpholine, N-ethylmorpholine, N-(2-hydroxyethyl)morpholine), aromatic amines (including, but not limited to, N,N-dimethyl-p-toluidine), tertiary amines having two nitrogen atoms in a molecule including, but not limited to, aliphatic amines (including, but not limited to, N,N,N,'N'-tetramethyl ethylenediamine, N,N,N',N'-tetramethyl propane-1,3-diamine, N,N,N',N'-tetramethyl hexane-1,6-diamine, bis(N,N-dimethylaminoethyl)ether, bis (2-dimethylaminoethyl)ether, ethylene glycol bis(3-dimethylaminopropyl)ether), alicyclic amines (including, but not limited to, N'-cyclohexyl-N,N-dimethylformamidine), heterocyclic amines (including, but not limited to, N,N'-dimethylpiperazine, trimethylpiperazine, 1,2-piperidinoethane, bis(aminopropyl) piperazine, N-methyl-N'-2-hydroxyethyl)piperazine, N-(N', N'-dimethylaminoethyl)morpholine)bis(morpholinoethyl ether, bis(2,6-dimethylmorpholinoethyl)ether, 1,2-dimethylimidiazole, N-methylimidazole, 1,4-diazine, diazabicylo[2.2.2.]-octane (DABCO), 1,4-diazabicyclo [3.3.0]oct-4-en, 1,5-diazabicyclo[4.3.0]nona-5-en (DBN), 1,8-diazabicyclo]5.4.0]undece-7-en (DBU) and its phenol salt and octylic acid salt), tertiary amines having three nitrogen atoms in a molecule including, but not limited to, aliphatic amines (including, but not limited to, N,N,N',N', N"-pentamethyl diethylenetriamine, N,N,N',N',N'-pentamethyl dipropylenetriamine, tetramethyl guanidine), alicyclic amines (including, but not limited to, N-cyclohexyl-N',N',N",N"-tetramethyl guanidine), heterocyclic amines (including, but not limited to, N-methyl-N'-(2-dimethylamino)ethylpiperazine, 1,5,7-triazabicyclo [4.4.0]dece-5-en), tertiary amines with four nitrogen atoms in a molecule including, but not limited to, aliphatic amines (including, but not limited to, 1,1,4,7,10-10-hexamethyl triethylenetramine), heterocyclic amines (including, but not limited to, 1,3,5-tris(N,N-dimethylpropyl)hexahydro-1,3,5-triazine). These tertiary amines can be used singly or as a mixture of two or more components. When tertiary amine catalysts are used, the time for the reaction between the monoisocyanate and the macromer-precursor material is about 24 to about 72 hours.

In a preferred embodiment, a macromer comprises the reaction product of a protected HEMA, including, but not limited to, 2-(trimethylsiloxy)ethyl methacrylate (TMS-HEMA); methylmethacrylate (MMA); TRIS; mPDMS; and TMI. Other compounds optionally used in the macromer synthesis include, but are not limited to, tetrahydrofuran (THF), moisture scavengers (including, but not limited to, bis(dimethylamino)-methylsilane), p-xylene, other catalysts (including, but not limited to, tetrabutylammonium 3-chlorobenzoate), initiators, and inhibitors.

A preferred embodiment of the present invention includes the following compounds in the macromer synthesis: bis (dimethylamino)-methylsilane, a solution of tetrabutylammonium 3-chlorobenzoate (TBACB) in THF, p-xylene, MMA, HEMA, methyltrimethylsilyl dimethylketene acetal, mPDMS, TRIS, methanol, dichloroacetic acid, TMI and bismuth(III) 2-ethylhexanoate as a macromer-forming catalyst.

Other preferred monomers which may be used in the monomer mix include, but are not limited to, TRIS; N,N-dimethyl acrylamide (DMA); tetraethyleneglycoldimethacrylate (TEGDMA), mPDMS and HEMA.

The electrophilic compound and macromer-precursor material are exposed to a macromer-forming catalyst in order to synthesize the macromer. The condensation reaction of the electrophilic compound and the macromer-precursor material is catalyzed by the macromer-forming catalyst. When the electrophilic compound is an isocyanate, and the reactive groups on the monomer-precursor are hydroxyls, the basic reaction is conducted in the presence of a macromer-forming catalyst as follows:

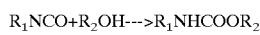

$R_1NCO + R_2OH \longrightarrow R_1NHCOOR_2$

The preferred macromer-forming catalysts are tertiary amines or bismuth catalysts, most preferably TEA or bismuth (III) 2-ethylhexanoate.

In a preferred embodiment, the TEA catalyst is introduced in liquid form to the electrophilic compound and macromer-precursor material, which react to form the macromer.

In another preferred embodiment, the bismuth catalyst is introduced in liquid form to the electrophilic compound and macromer-precursor material which react to form the macromer.

In another preferred embodiment, the macromer-forming catalyst is present with the reactants perfluoropolyether Fombline® ZDOL (from Ausimont S.p.A. Milan), isophorone diisocyanate, α,ω-hydroxypropyl-terminated polydimethylsiloxane KF-6001 from Shin-Etsu and 2-isocyanatoethyl methacrylate. The resultant macromer is used to produce contact lenses by subsequently reacting the macromer, TRIS and DMA with an initiator. The resultant macromer and subsequent reaction is similar to that disclosed in Examples B1 and B5 of U.S. Pat. No. 5,760,100 except that in the present invention, TEA or bismuth catalyst is used instead of DBTDL and different initiators may be used.

In another preferred embodiment, the bismuth catalyst is present with the reactants, a polyvinyl alcohol and an isocyanate, which react to form a polyvinyl alcohol derivative macromer. The polyvinyl alcohol derivative macromer, preferably having at least about 2000 number molecular weight, include, but are not limited to, one of the following three formulas:

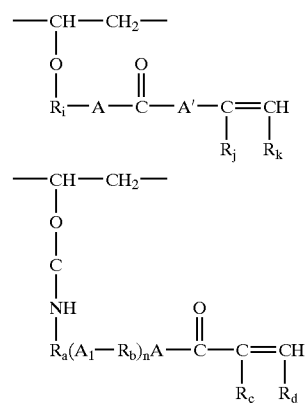

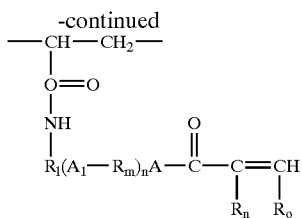

The polyvinyl alcohol reactant has the following formula:

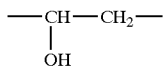

The isocyanate has the following formula:

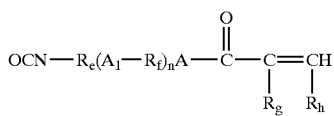

The polyvinyl alcohol derivative macromer is reacted in a subsequent reaction to produce ophthalmic lens material. The polyvinyl alcohol derivative macromer and subsequent reaction is similar to that disclosed in U.S. Pat. Nos. 4,665,123; 4,978,713; 4,720,187; and 4,670,506, except that in the present invention, bismuth catalyst is used and different initiators may be used in the subsequent reaction.

In another preferred embodiment, the macromer-forming catalyst is removed from the reaction product produced by the electrophilic compound and the macromer-precursor material. The removal of the macromer-forming catalyst may be effected by purification techniques, including, but not limited to, extraction, crystallization, precipitation, distillation, evaporation, and other purification methods. The removal of the macromer-forming catalyst may occur before, during or after the addition of an initiator to the reaction product produced by the electrophilic compound and the macromer-precursor material. In a preferred embodiment, the macromer-forming catalyst is removed prior to the addition of the initiator. In the prior art, DBTDL catalyzed macromer contains about 15 to about 105 ppm tin, following macromer synthesis and purification. In comparison, the present invention of bismuth catalyzed macromer contains less than about 9 ppm bismuth, following macromer synthesis and purification.

The macromers may then be used in medical devices, such as ophthalmic lenses. The process of making ophthalmic lenses proceeds by combining the components of a monomer mix together with the initiators and stabilizers described herein according to well known methods of lens formation such as photoinitiated casting in lens molds.

The preferred components of the monomer mix used to make the silicone hydrogel lenses of this invention includes macromer, and photoinitiator (which is added to the monomer mix before the mix is placed in a lens mold for lens production), and optionally additional monomers. In certain embodiments, the monomer mix further comprises at least one ultraviolet absorbing compound. Suitable ultraviolet absorbing compounds are known in the art, and fall into several known classes which include, but are not limited to benzophenones, benzotriazoles, triazines, substituted acrylonitriles, salicyclic acid derivatives, benzoic acid derivatives, nickel complexes, cinnamic acid derivatives, chalcone derivatives, dypnone derivatives, crotonic acid derivatives, or any mixtures thereof. Other additives may also be present and include, but are not limited to, stabilizers, reactive dyes, organic and inorganic pigments, dyes, photochromic compounds, release agents, antimicrobial compounds, mold lubricants, wetting agents, and combinations thereof. For example, the monomer mix may include but is not limited to siloxanes and acrylic/methacrylic acid and derivatives, polyvinyl monomers, typically di- or tri-vinyl monomers, such as di- or tri(meth) acrylates of diethyleneglycol, triethyleneglycol, tetraethyleneglycol, butyleneglycol and hexane-1,6-diol; divinylbenzene. In a preferred embodiment, the siloxane component is a polydimethyl siloxane. It is combined with a hydrophilic monomer such as DMA, N-vinylpyrrolidone (NVP), hydroxyethyl methacrylate or acrylate derivative.

In another preferred embodiment, the monomers comprise mPDMS such as monomethacryloxypropyl terminated polydimethyl siloxane and a macromer comprising the reaction product of HEMA, MMA, TRIS, mPDMS and TMI. Additionally preferred monomers include, but are not limited to, TRIS; DMA; and TEGDMA. Other monomers and crosslinking agents known in the art for making silicone hydrogels can also be used.

Suitable photoinitiators for use in the present invention are those which are activated by exposure to visible light. The photoinitiators of this invention are those having the following structure:

Structure I

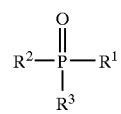

wherein, $R^1$, $R^2$, and $R^3$ are each independently H or a $C_{1-12}$ substituted or unsubstituted alkyl, cycloalkyl, or aromatic moiety provided that at least one of $R^1$, $R^2$ and $R^3$ has the following structure:

Structure II

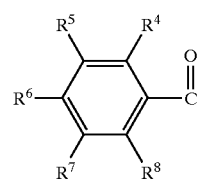

and is attached to the P at the acyl carbon, and wherein, $R^4$–$R^8$ are independently, H or a $C_{1-3}$ substituted or unsubstituted alkyl or alkoxy moiety.

In each case, where an $R^1$–$R^8$ group is substituted, the substituent can comprise a hydroxy or $C_{1-4}$ alkyl, alkoxy, alkenyl, or alkynyl group. Substitution with hetero atoms such as nitrogen, sulfur, and halo atoms is possible but is not favored.

It is preferred that $R^1$ and $R^2$ are both Structure II moieties with $R^4$ and $R^8$ substituents. It is most preferred that $R^4$ and $R^8$ are methoxy groups. It is further preferred in this embodiment that $R^3$ is a $C_{1-10}$ alkyl, alkoxy, or alkenyl group substituted with $C_{1-2}$ alkyl groups; most preferably a substituted pentyl group. In a preferred embodiment, both $R^1$ and $R^2$ are Structure II where $R^4$, $R^6$ and $R^8$ may be methyl and $R^3$ may be phenyl (e.g. Irgacure 819).

A preferred embodiment has the following structure:

Structure III

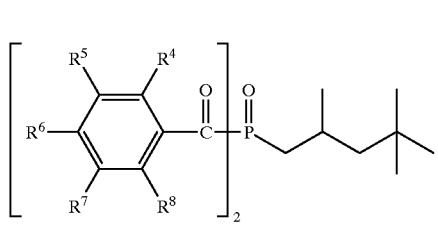

In a preferred embodiment, $R^1$ and $R^2$ are both Structure II moieties with $R^4$ and $R^8$ being methoxy groups; $R^1$ is a trimethyl pentyl group.

These photoinitiators can be used alone or in combination with other initiators, including, but not limited to, benzoin methyl ether, 1-hydroxycyclohexyl phenyl ketone (commercially available as "Irgacure® 184"); 2-benzyl-2-n-dimethylamino-1-(4-morpholinophenyl)-1-butanone (commercially available as "Irgacure® 369"); 1-hydroxycyclohexyl phenyl ketone (50% by weight) plus benzophenone(commercially available as "Irgacure® 500"); 4-(2-hydroxyethoxy)phenyl-(2-hydroxy propyl)ketone (commercially available as "Irgacure® 2959"); 2-hydroxy-2-methyl-1-phenyl-propan-1-one (HMPP); 2,2-dimethoxy-2-phenylacetophenone (BDK) (commercially available as "Irgacure® 651"); bis(n1-2,4-cyclopentadien-1-yl), Titanium bis(.eta.5-2,4-cyclopentadien-1-yl)bis[2,6-difluoro-3-(1H-pyrrol-1-yl)phenyl] (CGI-784); 2-hydroxy-2-methyl-1-phenyl-propan-1-one (HMPP) (commercially available as "Darocur® 1173"); or mixtures thereof.

The following examples compare the ophthalmic lenses prepared from the present invention to those prepared according to the prior art. Notably, the lenses prepared according to the present invention are acceptable for use and are equivalent to the reference lenses.

EXAMPLE 1

The following is an example of the present invention's macromer synthesis.

TABLE 1

| Chemical | Weight (g) or volume (ml) |
|---|---|
| bis(dimethylamino)-methylsilane | 5.72 g |
| 1.0 M Solution of tetrabutylammonium 3-chlorobenzoate (TBACB) in THF | 2.6 ml |
| p-xylene | 15.83 g |
| MMA | 29.44 g |
| TMS-HEMA | 361.16 g |
| THF | 840 g |
| Methyltrimethylsilyl dimethylketene acetal | 38.53 g |
| 0.4 M solution of tetrabutylammonium 3-chlorobenzoate (TBACB) in THF | 6 ml |
| Step 2 | |
| TMS-HEMA | 89.23 g |
| mPDMS | 693.00 g |
| TRIS | 701.46 g |
| bis(dimethylamino)-methylsilane | 3.81 g |
| Step 3 | |
| Solution of TMS-HEMA | 361.16 g |
| MMA | 29.44 g |

TABLE 1-continued

| Chemical | Weight (g) or volume (ml) |
|---|---|
| bis(dimethylamino)-methylsilane | 1.92 g |
| THF | 270 g |
| Step 4 | |
| Water | 93.9 g |
| Methanol | 141.2 g |
| Dichloroacetic acid | 1.68 g |
| Step 5 | |
| 3-Isopropenyl-α,α-dimethylbenzyl isocyanate | 169.07 g |
| Bismuth catalyst K-KAT 348 | 1.18 g |

TMS-HEMA, MMA, mPDMS (about 800 to about 1000 MW), TRIS, p-xylene and tetrahydrofuran (THF) were dried over preactivated 4A molecular sieve, and THF, mPDMS, and TRIS were passed through aluminum oxide column before use.

To a dry container in a dry box under nitrogen was added bis(dimethylamino)-methylsilane, a 1M solution of tetrabutylammonium 3-chlorobenzoate (TBACB) in THF, p-xylene, MMA (1.4 eqv. relative to initiator), TMS-HEMA (8.5 eqv. relative to photoinitiator) and THF. The above mixture was charged to a dry flask equipped with a thermocouple and a condenser connected to a nitrogen source.

To the reaction mixture was injected methyltrimethylsilyl dimethylketene acetal while stirring and purging with nitrogen. The reaction was allowed to exotherm to about 65° C. and then after the temperature of the solution dropped, a solution of TBACB in dry THF (0.4 M) was fed in slowly throughout the rest of the reaction. Then in step 2, a mixture of TMS-HEMA (2.1 eqv. to initiator), mPDMS (3.3 eqv. to initiator), TRIS (7.9 eqv. to initiator) and bis(dimethylamino)-methylsilane, prepared in dry box, was added under nitrogen.

The reaction mixture was again allowed to exotherm to approximately 42° C. and then allowed to cool to 32° C. The solution was stirred at 32° C. by using a temperature controller and heating equipment for about five hours. In step 3, a mixture on of TMS-HEMA (8.5 eqv. to initiator), MMA (1.4 eqv. relative to initiator) and bis(dimethylamino)-methylsilane was added and the whole mixture allowed to exotherm to 46–49° C. After the mixture reacted about two hours, 270 g of THF was added to reduce the viscosity and the solution was stirred for additional 30 minutes.

In step 4, a mixture of water, methanol and dichloroacetic acid was added and the mixture was refluxed for five hours to de-block the protecting groups. The solvents were then removed by distillation and toluene was added to aid in removal of residual water until a vapor temperature reached 110° C.

A solution of TMI and 0.2 mole % bismuth catalyst K-KAT 348 relative to TMI was added to the above solution in toluene. The whole mixture was stirred at 110° C. for three hours and the disappearance of the isocyanate peak was monitored by IR. The toluene was removed under reduced pressure at around 45° C. to give a raw macromer.

Purification procedures were employed to remove high molecular weight species. The raw macromer was re-dissolved in acetone (2:1 w/w acetone to macromer) and the acetone solution was set overnight to allow high molecular weight species to separate. The top clear phase was filtered through a PTFE membrane by pressure filtration. The filtrate was slowly charged into water (4:1 v/v water to filtrate) and the macromer was precipitated out. The macromer was collected and dried using a vacuum oven at 45–65° C. under reduced pressure until there was no weight change.

Further purification to remove low molecular weight species was also done by re-precipitation of the macromer from the mixture of acetone and acetonitrile (1:5 v/v).

EXAMPLE 2

A bismuth catalyst and a TEA catalyst were each separately used to synthesize the macromer (as described in Example 1), which was later used to make ophthalmic lenses. The lenses were made via direct molding, using a closed mold under conventional molding conditions. These lenses were compared.

The lenses were optically clear. The bismuth catalyst macromer has at least a 10-week shelf-life at 55° C. The TEA catalyzed macromer has at least a 30-week shelf-life at 55° C.

The results of this study are noted in the table below.

TABLE 2

Standard deviations are noted in the parentheses.

| Lens Property | TEA macromer | Bismuth macromer |
| --- | --- | --- |
| Water content (%) | 40.0 (0.3) | 40.0 (0.1) |
| Modulus (psi) | 61.9 (3.7) | 69.1 (5.3) |
| Elongation (%) | 309 (32) | 318 (61) |

EXAMPLE 3

Another study compared the ophthalmic lenses made using TEA catalyst and DBTDL catalyst in the macromer formation described in Example 1. The DBTDL catalyzed macromer also uses acetic acid in the formation process as described in U.S. patent application Ser. No. 01/09,076. The elastic modulus values for lenses from DBTDL-catalyzed macromer were comparable to the modulus for lenses from TEA-catalyzed monomer, but the DBTDL-catalyzed macromer lenses were unacceptable to wear because they were misshapen and had torn or jagged edges. Acceptable modulus values are about 30 to about 200 psi, more preferably about 35 to about 150 psi, and most preferably about 38 to about 100 psi. Water content values and Dk [units=×$10^{-9}$ (cm/sec)(mL $O_2$/mL×mm Hg)] values show little or no dependency on macromer-forming catalyst used in the macromer synthesis.

Table 3 reflects the measurements of relevant characteristics for the average of 8 batches using TEA-catalyzed macromer in monomer mixes and the average of 3 batches using DBTDL-catalyzed macromer in monomer mixes.

TABLE 3

Modulus, Elongation, Percent Water Content and Dk Values for lenses made from monomer mixes containing TEA and DBTDL-catalyzed macromer
Standard deviations are noted in the parentheses

| Macromer Macromer-forming catalyst | Modulus (psi) | Elongation (%) | Water Content (%) | Dk* |
| --- | --- | --- | --- | --- |
| TEA | 81 (5) | 272 (20) | 38 (0.2) | 106 (11) |
| DBTDL | 70 (3) | 296 (6) | 38 (0.6) | 108 (17) |

*Dk units = × $10^{-9}$ (cm/sec)(mL $O_2$/mL × mm Hg)

EXAMPLE 4

A monomer mix was made from macromer, which was made as described in Example 1, by combining the following: 17.98% (wt) macromer from Example 1, 28.0% mPDMS (MW 800–1000), 14.0% TRIS, 26.0% DMA, 5.0% HEMA, 1.0% TEGDMA, 2.0% Norbloc (2-(2'-hydroxy-5-methacrylyloxyethylphenyl)-2H-benzotriazole), 0.02% Blue HEMA (product of the base-promoted displacement of one chloride of Reactive Blue # 4 dye by hydroxyethyl methacrylate), 5.0% PVP (K90), and 1.0% CGI 1850 (1:1 (wt) blend of 1-hydroxycyclohexyl phenyl ketone and bis (2,6-dimethoxybenzoyl)-2,4-4-trimethylpentyl phosphine oxide) blended with the diluent 3,7-dimethyl-3-octanol in a ratio of 80 parts (wt) of the blend with 20 parts (wt) diluent.

The enthalpy of photopolymerization was measured using a TA Instruments differential photocalorimeter with a mercury vapor lamp, with the sample at 70° C. under a nitrogen atmosphere. The enthalpy of photopolymerization was measured as a function of monomer mix storage time at 55° C. The results are shown in FIG. 1, showing monomer mixes made using macromer made using the procedure of Example 1 with the following macromer-forming catalysts: TEA, DBTDL (with acetic acid) or K-KAT 348 bismuth carboxylate catalyst. The enthalpy values are the average of two measurements each.

Enthalpy values for monomer mixes made using TEA or K-KAT 348 are statistically equivalent and do not exhibit a decrease over time as compared to monomer mixes made using DBTDL in the prior art. Without being limited to the mechanism, the degradation of the enthalpy values for the monomer mixes made using DBTDL represents degradation of the visible-light photoinitiator.

EXAMPLE 5

A monomer mix was made from the following: 17.98% (wt) macromer from Example 1 but made with DBTDL in place of K-KAT 348 bismuth carboxylate catalyst, 28.0% mPDMS (MW 800–1000), 14.0% TRIS, 26.0% DMA, 5.0% HEMA, 1.0% TEGDMA, 2.0% Norbloc (2-(2'-hydroxy-5-methacrylyloxyethylphenyl)-2H-benzotriazole), 0.02% Blue HEMA product of the base-promoted displacement of one chloride of Reactive Blue # 4 dye by hydroxyethyl methacrylate), 5.0% PVP (K90), and 1.0% CGI 1850 (1:1 (wt) blend of 1-hydroxycyclohexyl phenyl ketone and bis (2,6-dimethoxybenzoyl)-2,4-4-trimethylpentyl phosphine oxide) blended with the diluent 3,7-dimethyl-3-octanol in a ratio of 80 parts (wt) of the blend with 20 parts (wt) diluent.

Immediately after this monomer mix was made, contact lenses were made by curing in plastic molds under irradiation for 30 minutes with visible light fluorescent bulbs (Philips TL 20W/03T fluorescent bulbs) at 45° C. The molds were opened and the lenses were released in 60% IPA in water, then soaked at least one hour each in 100%, 75%, 50% and 25% (v/v) IPA in water. The resulting lenses were round and symmetrical, and had smooth optical surfaces.

After storing the monomer mix for four days at 56° C. ("aged monomer mix"), a second set of lenses were made using the same process. These lenses made from aged monomer mix were asymmetrical, and had rough and unacceptable optical surfaces.

In contrast, lenses made with the same process from a monomer mix with a bismuth catalyzed macromer (as described in Example 1) were symmetrical and had smooth optical surfaces even when made from a monomer mix stored for 4 weeks or longer at 56° C.

It is understood that while the invention has been described in conjunction with the detailed description thereof, that the foregoing description is intended to illustrate and not limit the scope of the invention, which is defined by the scope of the appended claims. Other aspects, advantages, and modifications are evident from a review of the following claims.

What is claimed is:

1. A method of preparing a monomer mix comprising:
   reacting an electrophilic compound and a macromer-precursor material comprising silicone in the presence of a macromer-forming catalyst comprising a bismuth salt, to form a reaction product comprising a macromer and said macromer forming catalyst;
   wherein the macromer-forming catalyst is compatible with a visible light photoinitiator; and
   preparing a monomer mix comprising the reaction product, and the photoinitiator.

2. The method of claim 1 wherein said macromer-forming catalyst is selected from the group consisting of bismuth carboxylates, bismuth trioxide $Bi_2O_3$, bismuth orthohydroxide $Bi(OH)_3$, bismuthyl hydroxide BiO(OH), bismuth nitrate $(BiO)NO_3$, and bismuth carbonate $(BiO)_2CO_3$.

3. The method of claim 1 wherein the macromer-forming catalyst comprises bismuth(III) 2-ethylhexanoate.

4. The method of claim 3 wherein the macromer-forming catalyst is present at about 0.02 mole % to about 2.0 mole % relative to the electrophilic compound.

5. The method of claim 1 wherein the macromer-forming catalyst is in liquid form.

6. The method of claim 1 wherein the electrophilic compound is selected from the group consisting of 3-isopropenyl-α,α-dimethylbenzyl isocyanate, vinylbenzyl, chloride, allyl chloride, meth(acryloyl)chloride, (meth) acrylic anhydride, methyl methacrylate, methacrylamidoacetaldehyde dimethylacetal, 4-methacrylamidobutyraldehyde diethylacetal, glycidyl(meth)acrylate, 2-isocyanatoethyl methacrylate, allyl isocyanate, vinyl isocyanate, isomeric vinylbenzyl isocyanate of hydroxyethyl methacrylate, adduct of 2-hydroxyethyl methacrylate and 2,4-toluene diisocyanate, adduct of 2-hydroxyethyl methacrylate and isophorone diisocyanate and mixtures thereof.

7. The method of claim 1 wherein the electrophilic compound comprises 3-isopropenyl-α,α-dimethylbenzyl isocyanate.

8. The method of claim 1 wherein the electrophilic compound comprises 2-isocyanatoethyl methacrylate.

9. The method of claim 1 wherein the macromer-precursor material is material is formed from at least one silicone containing monomer and at least one monomer selected from the group consisting of hydroxyethyl acrylate, hydroxypropyl acrylate, hydroxypropyl methacrylate, ethoxylated hydroxyethyl methacrylate, polypropylene glycol monomethacrylate, caprolactone acrylate, beta carboxyethyl acrylate, hydroxyethyl vinyl ether, N-(2-hydroxyethyl) methacrylamide, 3,4-dihydroxybutyl methacrylate, N-hydroxymethyl acrylamide, N-hydroxymethyl methacrylamide, 2-t-butylaminoethyl methacrylate, acrylic acid, methacrylic acid, itaconic acid, 2-hydroxyethyl methacrylate, polyvinyl acrylate, polyvinyl alcohol, glycerylmonomethacrylate, methyldi(trimethylsiloxy) sylylpropylglycerol methacrylate, hydroxyethylmethacrylate, dextran, hydroxypropylcellulose, 2-hydroxyethylcellulose, and hydroxymethylcellulose, mixtures thereof and polymers and copolymers thereof.

10. The method of claim 1 wherein the macromer-precursor material has at least 2 reactive groups.

11. The method of claim 1 wherein the macromer precursor material comprises isocyanate-reacting functional groups, the electrophilic compound comprises electrophilic functional groups and the molar ratio of electrophilic functional groups to the isocyanate-reacting functional groups is at a molar ratio of 1:2, Wherein the isocyanate-reacting group comprises at least 2 isocyanate-reacting functional groups.

12. The method of claim 1 wherein the macromer precursor material comprises isocyanate-reacting functional groups, the electrophilic compound comprises electrophilic functional groups and the molar ratio of electrophilic functional groups to the isocyanate-reacting functional groups is at a molar ratio of 1:8, wherein the isocyanate-reacting group comprises at least 8 isocyanate-reacting functional groups.

13. The method of claim 1 wherein the macromer precursor material comprises isocyanate-reacting functional groups, the electrophilic compound comprises electrophilic functional groups and the molar ratio of electrophilic functional groups to the isocyanate-reacting functional groups is at a molar ratio of 1:1 to 0.001:1.

14. The method of claim 1 wherein the macromer precursor material comprises isocyanate-reacting functional groups, the electrophilic compound comprises electrophilic functional groups and the molar ratio of electrophilic functional groups to the isocyanate-reacting functional groups is at a molar radio of 1:1 to 0.05:1.

15. The method of claim 1 wherein the macromer precursor material comprises isocyanate-reacting functional groups, the electrophilic compound comprises electrophilic functional groups and the molar ratio of electrophilic functional groups to the isocyanate-reacting functional groups is at a molar ratio of 1:1 to 0.1:1.

16. The method of claim 1 further comprising removing the macromer-forming catalyst from the reaction product.

17. The method of claim 1 wherein the photoinitiator comprises a bis-(2,6-dimethoxybenzoyl)-(2,4,4-trimethylpentyl) phosphine oxide.

18. The method of claim 1 wherein the photoinitiator comprises bis-(2,4,6-trimethybenzoyl)-phenylphosphine oxide.

19. The method of claim 1 wherein the photoinitiator comprises acyl phosphine oxide.

20. The method of claim 1 wherein the reaction product is substantially produced in about 3 hours.

* * * * *